United States Patent [19]

Ziph et al.

[11] Patent Number: 4,818,065
[45] Date of Patent: Apr. 4, 1989

[54] OPTICAL DEVICE PARTICULARLY USEFUL AS AS NIGHT VISION GOGGLES

[75] Inventors: Leah Ziph, Haifa; Shay Ghilai, Zahala, both of Israel

[73] Assignee: Elbit Computers Ltd., Haifa, Israel

[21] Appl. No.: 163,048

[22] Filed: Mar. 2, 1988

[30] Foreign Application Priority Data

Mar. 4, 1987 [IL] Israel ......................... 81775

[51] Int. Cl.⁴ ............................................. G02B 27/14
[52] U.S. Cl. ..................................... 350/174; 350/169
[58] Field of Search ............... 350/169, 170, 171, 172, 350/174, 601; 356/398, 390

[56] References Cited

U.S. PATENT DOCUMENTS

| | | | |
|---|---|---|---|
| 4,000,419 | 12/1976 | Crost et al. | 350/174 |
| 4,012,123 | 3/1977 | Fuller | 350/174 |
| 4,274,149 | 6/1981 | Flanagan | 350/174 |
| 4,749,271 | 6/1988 | Nagler | 350/171 |

Primary Examiner—John K. Corbin
Assistant Examiner—P. M. Dzierzynski
Attorney, Agent, or Firm—Benjamin J. Barish

[57] ABSTRACT

An optical device comprising a monocular assembly including an objective lens to be located remote from the viewer's eye for viewing a scene, and a cathode ray tube and prism assembly for injecting additional information into the viewed scene. The prism assembly is adjacent to and aligned with the objective lens and comprises a pair of transparent prisms having confronting inclined surfaces joined together at their inclined surfaces, and a reflector sandwiched between the joined inclined surfaces and having a surface area which is from 0.5% to 5.0% of the surface area of the objective lens.

20 Claims, 2 Drawing Sheets

OPTICAL DEVICE PARTICULARLY USEFUL AS AS NIGHT VISION GOGGLES

BACKGROUND OF THE INVENTION

The present invention relates to an optical device for viewing scenes. The invention is particularly applicable for use in night vision goggles having means for intensifying the image and further means for injecting additional information into the viewed scene; the invention is therefore described with respect to this application.

Night vision goggles having image intensifier means, to enable viewing scenes by moonlight or starlight, are known. Also known are such night vision goggles having means for injecting additional information into the viewed scene, such as electronically generated information to be viewed simultaneously with the viewed scene without removing the goggles. An example of the latter type of device is illustrated in U.S. Pat. No. 4,000,419. That patent describes an arrangement wherein the additional information injecting means is located adjacent to the eyepiece of one of the monocular assemblies.

SUMMARY OF THE INVENTION

An object of the present invention is to provide an optical device particularly useful for night vision goggles having advantages over the known devices, particularly the night vision goggles illustrated in the above patent, in a number of respects as will be described below.

According to the present invention, there is provided an optical device comprising a monocular assembly including an objective lens to be located remote from the viewer's eye for viewing a scene, and an eyepiece to be located adjacent to the viewer's eye; and means for injecting additional information into the viewed scene, including a prism assembly adjacent to and aligned with the objective lens of the monocular assembly on the side thereof opposite to its eyepiece. The prism assembly comprises a pair of transparent prisms having confronting inclined surfaces joined together at the inclined surfaces, and a reflector sandwiched between the joined inclined surfaces and having a surface area which is at least one order of magnitude smaller than the surface area of the objective lens.

Preferably, the reflector is sandwiched centrally between the joined surfaces, and the surface of the reflector is from 0.5% to 5.0%, optimally about 1.5%, of that of the objective lens.

In the preferred embodiment of the invention described below, the means for injecting additional information into the viewed scene includes information generating means located laterally of the optical device, and optical means including a collimator and an inclined reflector aligned between the information generating means and the prism assembly for reflecting the additional information from the information generating means to the prism assembly.

In the described preferred embodiment, the monocular assembly further includes an image intensifier tube located between the objective lens and the eyepiece; also there are two of the monocular assemblies, at least one of the assemblies including the means for injecting additional information into the scene viewed through the objective lens of the respective monocular assembly.

It will thus be seen that the optical device, and particularly the night vision goggles, of the present invention as briefly described above injects the additional information into the viewed scene adjacent to the objective lens of the monocular assembly, rather than adjacent to the eyepiece as described in the above-cited U.S. Pat. No. 4,000,419. Such an arrangement provides a number of important advantages:

One important advantage is that the novel arrangement provides a substantially larger field of view as compared to that provided in the arrangement of the above-cited patent; thus, in the novel arrangement, the full field of view of the goggles, approximately cone of 40°, can be used, whereas the maximum field of view in the arrangement of the above-cited patent is a cone of about 15°.

In addition, the novel arrangement loses a much smaller percentage of the outside light, about 1.5% in the described preferred embodiment, which is substantially less than the outside light lost by the arrangement in the above-cited patent, particularly in its prism 54 adjacent to the eyepiece of monocular assembly 48. The novel arrangement thus enables better viewing of the scene, and also decreases the difference in the amount of light received by the viewer's two eyes through the two monocular assemblies.

A still further advantage is that the novel arrangement can be used while the viewer wears eyeglasses, and produces no degradation of "eye relief", namely the distance between the rear of the eyepiece and the front surface of the eye within which an entire field of view of the optical system can be seen without vignetting or any substantial cutting-off of the outer portions of the image.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
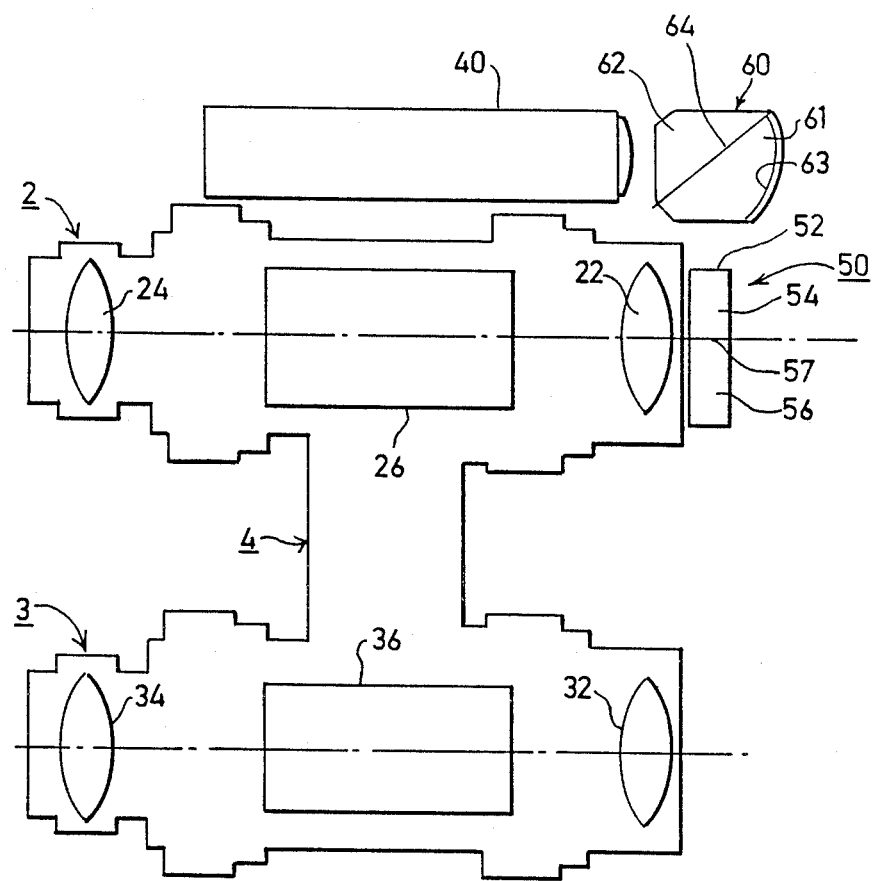
FIG. 1 is a schematic diagram illustrating a pair of night vision goggles constructed in accordance with the present invention.

The night vision goggles illustrated in FIG. 1 comprises two monocular assemblies 2, 3 amounted within a casing 4. Each monocular assembly includes an objective lens 22, 32, to be located remote from the viewer's eye for viewing a scene, and an eyepiece 24, 34 to be located adjacent the viewer's eye. Each monocular assembly further includes an image intensifier tube 26, 36 located between the objective lens and the eyepiece for intensifying the light received from the respective objective lens 22, 32, and thereby for enabling viewing scenes under moonlight or starlight conditions.

Night vision goggles of the type illustrated in FIG. 1 are well known, and therefore details of its construction and operation are not set forth.

When such night vision goggles are used by a pilot or co-pilot, they are usually attached to the user's helmet. Accordingly, it is desirable to inject into the scene viewed by the user, instrument panel information or other information so that the user can see this information at the same time he is viewing the scene through the goggles.

In the arrangement illustrated in FIG. 1, this additional information is generated in a cathode ray tube 40 located laterally of monocular assembly 2, and is injected into the scene viewed through that monocular assembly by means of a prism assembly 50 adjacent to and aligned with its objective lens 22. A second prism assembly 60 is provided between, and aligned with, cathode ray tube 40 and prism assembly 50 so as to reflect the information generated in the cathode ray tube to the entrance window 52 of prism assembly 50.

Figure 2:
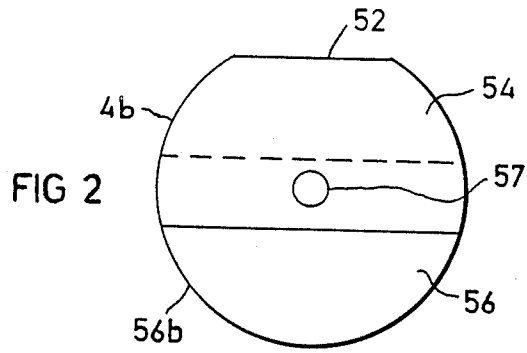
FIG. 2 is a front elevational view illustrating the prism assembly in the night vision goggles of FIG. 1 for injecting additional information into the viewed scene.
Figure 3:
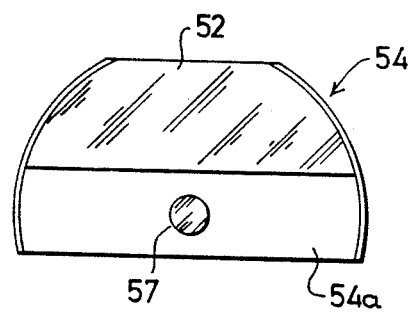
FIG. 3 illustrates one of the prisms in the prism assembly of FIG. 2, FIG. 3a being a side elevational view of FIG. 3.
Figure 3A:
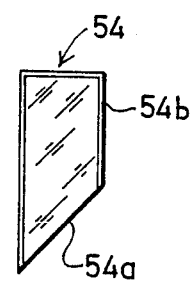
Figure 4:
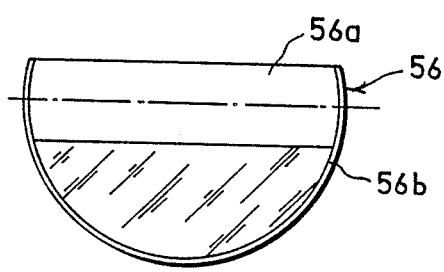
FIG. 4 illustrates the other prism in the prism assembly of FIG. 2, FIG. 4a being a side elevational view of FIG. 4.
Figure 4A:
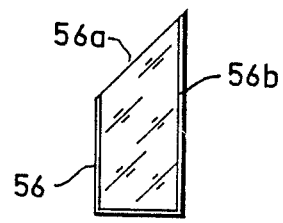

Prism assembly 50, more particularly illustrated in FIG. 2, is constituted of two transparent prisms, namely prism 54 illustrated in FIGS. 3 and 3a, and prism 56 illustrated in FIGS. 4 and 4a. Each prism is formed with a 450 inclined surface 54a, 56a, which surfaces face each and are joined together by a suitable transparent adhesive. When the two prisms 54, 56 are so joined, they form a prism assembly 50 of substantially cylindrical configuration having an outside diameter of substantially the same diameter as the objective lens 22. However, the surface of prism 54 facing prism assembly 60 is flattened, to define the entrance window 52 for receiving the information from the cathode ray tube 40 via prism assembly 60. The outer surfaces of both prisms 54, 56 are coated with an opaque paint, as shown at 54b, 56b, except for the flattened surface defining the entrance window 52 in prism 54, which flattened surface is left clear.

A reflector 57 is provided centrally of the inclined face 54a of prism 52 such that when the two prisms are joined together at their inclined faces 54a, 56a, reflector 57 is sandwiched between them at the centre of the prism assembly, and is aligned with the optical axis between the objective lens 22 and eyepiece 24 of the monocular assembly 2. Reflector 57 is of circular configuration and has a very small diameter such that its surface area is at least one order of magnitude smaller than the surface area of the prism assembly 50 and of the objective lens 22. Preferably, the surface area of reflector 57 is from 0.5% to 5.0% of the surface area of prism 50 and of objective lens 22. In the illustrated preferred example, the surface area of a reflector 57 is approximately 1.5% of the surface area of the prism assembly 50.

Prism assembly 60 serves to collimate the light from the face of CRT 40 and to direct it onto reflector 57 of prism assembly 50. Prism assembly 60 includes two transparent right triangular prisms 61, 62 joined together at their inclined faces. Prism 61 is formed with a curved mirror 63 which collimates the light received from CRT 40 and passing through prism 62, and reflects the collimated light back to a reflector layer 64 sandwiched between the inclined faces. The latter reflects the light via the entrance window 52 of prism assembly 50 to reflector 57 of the latter assembly.

It will thus be seen that when the night vision goggles illustrated in FIG. 1 are worn by a pilot or co-pilot, auxiliary information, such as information relating to the instrument panel, may be electronically generated in the cathode ray tube 40 and projected via prism assembly 60 and prism assembly 50 so as to be viewed with the scene seen by the viewer via monocular assembly 2 of the goggles. The described arrangement permits the user to view an approximately 40° cone field of view. This is a much larger field of view than that provided by the above-cited U.S. Pat. No. 4,000,419, the latter being a maximum of about a 15° cone. Moreover, the illustrated night vision goggles can be used by a user wearing eyeglasses, and there is no degradation of "eye relief". Further, a very small percentage of the outside light is lost, being about 1.5% in the preferred embodiment described above, thereby not only enhancing the viewability of the scene, but also decreasing the difference in the amount of light passing through the two monocular assemblies 2, 3.

While the invention has been described with respect to one preferred embodiment, it will be appreciated that many other variations, modifications and applications of the invention may be made.

What is claimed is:

1. An optical device comprising a monocular assembly including an objective lens to be located remote from a viewer's eye for viewing a scene, and an eyepiece to be located adjacent to the viewer's eye; and means for injecting additional information into the viewed scene, including a prism assembly adjacent to and aligned with the objective lens of said monocular assembly on the side thereof opposite to its eyepiece; said prism assembly comprising a pair of transparent prisms having confronting inclined surfaces joined together at said inclined surfaces, and a reflector sandwiched between said joined inclined surfaces and having a surface area which is at least one order of magnitude smaller than the surface area of the objective lens.

2. The optical device according to claim 1, wherein said reflector is sandwiched centrally between said joined inclined surfaces, and the surface area of said reflector is from 0.5% to 5.0% of the surface area of said objective lens.

3. The optical device according to claim 2, wherein the surface area of said reflector is approximately 1.5% of the surface area of the objective lens.

4. The optical device according to claim 1, wherein said means for injecting additional information into the viewed scene includes information generating means located laterally of said optical device, and optical means including a collimator and an inclined reflector aligned between said information generating means and said prism assembly for reflecting the additional information from the information generating means to said prism assembly.

5. The optical device according to claim 4, wherein said information generating means comprises a cathode ray tube.

6. The optical device according to claim 4, wherein said prism assembly includes an outer opaque coating except for an uncoated flat surface serving as the entrance window facing and aligned with said inclined reflector.

7. The optical device according to claim 4, wherein said optical means comprises a second prism assembly including a first prism having a collimating reflect or at one end and an inclined surface at the opposite end, a second prism having an inclined surface joined to the inclined surface of said first prism, and a reflector layer substantially of the same area as, and sandwiched between, said inclined surfaces.

8. The optical device according to claim 1, wherein said monocular assembly further comprises an image intensifier tube located between the objective lens and the eyepiece.

9. The optical device according to claim 1, wherein there are two of said monocular assemblies, at least one of said assemblies including means for injecting additional information into the scene viewed through the objective lens of the respective monocular assembly.

10. An optical device comprising a monocular assembly including an objective lens to be located remote from a viewer's eye for viewing a scene, and an eyepiece to be located adjacent to the viewer's eye; information generating means located laterally of said optical device; a prism assembly adjacent to and aligned with the objective lens of said monocular assembly on the side thereof opposite to its eyepiece; and optical means including a collimator and an inclined reflector aligned between said information generating means and said prism assembly for reflecting the additional information from the information generating means to said prism assembly; said prism assembly comprising a pair of transparent prisms having confronting inclined surfaces joined together at said inclined surfaces, and a reflector centrally between said joined inclined surfaces and having a surface area which is at least one order of magnitude smaller than the surface area of the objective lens.

11. The optical device according to claim 10, wherein said reflector is sandwiched centrally between said joined inclined surfaces, and the surface area of said reflector is from 0.5% to 5.0% of the surface area of said objective lens.

12. The optical device according to claim 11, wherein the surface area of said reflector is approximately 1.5% of the surface area of the objective lens.

13. The optical device according to claim 10, wherein said information generating means comprises a cathode ray tube.

14. The optical device according to claim 10, wherein said prism assembly includes an outer opaque coating except for an uncoated flat surface serving as the entrance window facing and aligned with said inclined reflector.

15. The optical device according to claim 10, wherein said optical means comprises a second prism assembly including a first prism having a collimating reflector at one end and an inclined surface at the opposite end, a second prism having an inclined surface joined to the inclined surface of said first prism, and a reflector layer substantially of the same area as, and sandwiched between, said inclined surfaces.

16. An optical device comprising two monocular assemblies each including an objective lens to be located remote from a viewer's eye for viewing a scene, and an eyepiece to be located adjacent to the viewer's eye; at least one of said monocular assemblies including means for injecting additional information into the viewed scene, comprising a prism assembly adjacent to and aligned with the objective lens of the respective monocular assembly on the side thereof opposite to its eyepiece; said prism assembly comprising a pair of transparent prisms having confronting inclined surfaces joined together at said inclined surfaces, and a reflector sandwiched between said joined inclined surfaces and having a surface area which is at least one order of magnitude smaller than the surface area of the respective objective lens.

17. The optical device according to claim 16, wherein said reflector is sandwiched centrally between said joined inclined surfaces, and the surface area of said reflector is from 0.5% to 5.0% of the surface area of said objective lens.

18. The optical device according to claim 16, wherein said means for injecting additional information into the viewed scene includes information generating means located laterally of said optical device, and optical means including a collimator and an inclined reflector aligned between said information generating means and said prism assembly for reflecting the additional information from the information generating means to said prism assembly.

19. The optical device according to claim 18, wherein said prism assembly includes an outer opaque coating except for an uncoated flat surface serving as the entrance window facing and aligned with said inclined reflector.

20. The optical device according to claim 18, wherein said optical means comprises a second prism assembly including a first prism having a collimating reflector at one end and an inclined surface at the opposite end, a second prism having an inclined surface joined to the inclined surface of said first prism, and a reflector layer substantially of the same area as, and sandwiched between, said inclined surfaces.

* * * * *